Figure 1:
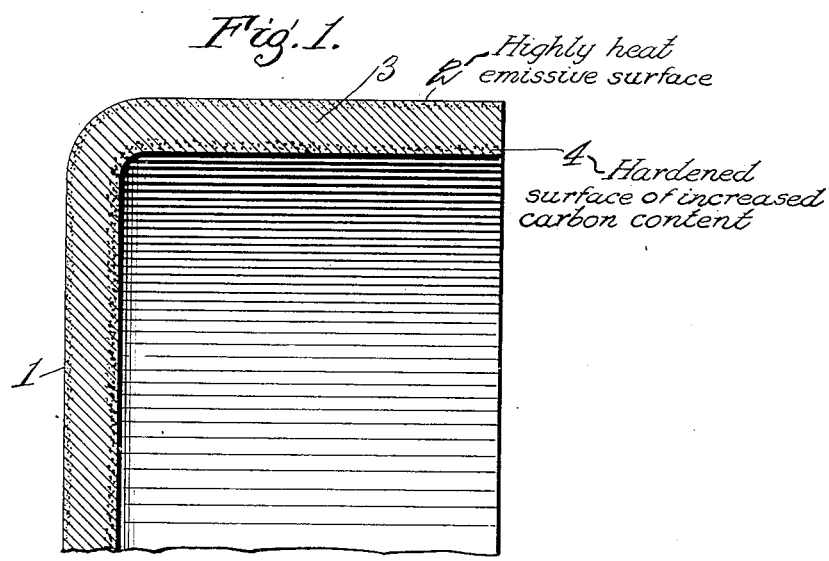

July 10, 1934.   R. J. NORTON   1,966,130
BRAKE DRUM
Filed Oct. 18, 1930

Highly heat emissive surface
Hardened surface of increased carbon content

Inventor
R. J. Norton

By
M. W. McConkey
and
Semmes & Semmes
Attorneys

Patented July 10, 1934

1,966,130

UNITED STATES PATENT OFFICE 1,966,130

BRAKE DRUM

Raymond J. Norton, Washington, D. C., assignor to Bendix Brake Company, South Bend, Ind., a corporation of Illinois Application October 18, 1930, Serial No. 489,692

9 Claims. (Cl. 188—218)

This improvement relates to brake drums.

The brake drums now ordinarily employed comprise a low carbon steel pressed member. Due to the rigorous conditions of service, it is desirable to provide a brake drum with a frictional engaging surface which is quite wear resistant. As ordinarily manufactured, the wearing surfaces of brake drums are not particularly resistant to abrasion because of the physical characteristics of the materials employed in their manufacture.

Another desideratum in brake drum structures is to provide for the rapid dissipation of heat. The need for this has increased in recent years since the development of the Bendix servo type of brake. Some attention has been paid to this in the past as is evidenced by the proposals of brake drums having heat dissipating fins. This expedient, however, is not particularly desirable because these fins are relatively massive and add considerably to the cost as well as to the weight of the member. Furthermore, they are not in fact particularly efficient as heat dissipators.

Another useful property in a brake drum is resistance to corrosion. When the drum is manufactured of low carbon steel, corrosion may soon set in resulting in the formation of a film of iron oxide. This formation of the iron oxide film accelerates the sub-surface corrosion. Corrosion generally is rather accentuated in these members because of the accelerating effects of the generated heats of friction.

It is a major object of the present invention to provide a brake drum of a simple composite structure which is highly efficient in dissipating heat, resisting corrosion and resisting wear.

Another object is to provide a brake drum of a hardened frictional surface and a highly effective heat emissive surface.

Yet another object is to provide a brake drum having a hardened frictional engaging surface and a total exterior surface of high heat emissivity.

With these and other equally important objects in view the invention comprehends the provision of a brake drum of ferruginous material, preferably low carbon steel, the frictional engaging surface of which is characterized by a higher degree of hardness than the remainder of the drum, and the exterior exposed surface of which is characterized by a higher corrosion resistance and a higher heat emissivity than the remainder of the drum.

In carrying out the invention the brake drum may first be formed up in the usual manner from a low carbon deep draw steel. After formation the interior frictional engaging surface may be subjected to a case hardening or carburizing process so as to render this portion of the drum harder than the remainder and thereby increase its resistance to the abrasion attendant upon frictional braking. Either after the carburizing treatment or before, any predetermined portion of the exterior surface, as for example the braking flange, may be treated so as at the one time to increase its resistance to corrosion and increase its heat emissivity. This may readily be done by calorizing the interior surface and then subjecting this surface to anodic oxidation so as to form on the surface a skin or coating, or layer, of aluminum oxide. As will be recognized, aluminum oxide is one of the best heat emitters and corresponds in this respect to lamp black, whose heat emissivity factor is practically 100. It will be appreciated that, if desired, the calorizing treatment may precede the carburizing treatment, or the two treatments may be carried on at the same time.

The specific manner of carrying out the invention may, of course, be varied depending upon the particular types of carburizing and calorizing treatments desired. The frictional engaging surface of the drum may be carburized by first cleaning the drum, as by sand blasting, pickling, washing with a suitable solvent such as benzine, or by electrolytic cleaning. After the drum has been suitably cleaned, the frictional engaging surface is subjected to the action of a carbon containing material such as potassium cyanide, charcoal or the like, and heated to a temperature of about 900° C. more or less.

As is well known to those skilled in the art, the depth of the skin obtained will depend upon the materials employed, the carburizing temperature, and the time period during which the treatment is carried out. As a general rule the impure forms of carbon produce the most rapid results; similarly the process is accelerated in the presence of nitrogen which may be brought into the process in any desirable form, such as ammonia. As a result of this treatment, it appears that the carbon enters into solid solution with the steel and provides a skin which is considerably harder than the remainder of the drum. If desired the drum, after the carburizing treatment, may be quenched slowly so as to obtain a gradual gradation of the carbon content in the material.

The exterior surface may be calorized by methods well known. For example, after cleaning, the exterior surface of the drum may be contacted with a mass containing aluminum powder and a small quantity of zinc and aluminum chloride. This mass is then heated up to calorizing temperatures which range from about 900° to 950° C. Under these conditions or under the conditions of other specific calorizing treatments, the aluminum is alloyed with and dispersed through the metal of the drum adjacent the contacting surface. It will be understood that the heat may be varied in extent and intensity to regulate the degree and character of the combination of the two metals and the depth of diffusion of the aluminum.

It is also to be observed that inasmuch as the temperature ranges of the two treatments are about the same they may be carried on simultaneously so that the interior and exterior surfaces of that portion of the drum which is to constitute the braking flange may be treated.

After the calorizing treatment has been completed the exterior surface may be subjected to oxidizing conditions to form a dull relatively thin adherent coat of aluminum oxide upon the surface. It will be understood that this film not only functions to prevent corrosion by interposing a mechanical protective coating but it also serves to increase the emission of radiant heat considerably above that which obtains for iron. The emission of aluminum oxide, as noted above, is approximately equal to that of lamp black and, therefore, is one of the best heat emitting agents.

The single figure in the drawing shows rather diagrammatically the finished form of the drum. This member comprises a drum head 1 having an integral braking flange 3. On the exterior of this flange is formed a skin 2 comprising at least in part an aluminous alloy of the ferruginous foundation metal which serves as a protection against corrosion and also as a very effective heat radiator by reason of the formation of the aluminum oxide. The internal frictional engaging surface 4 is a case hardened or carburized skin which has a higher degree of hardness than the remainder of the drum and is, therefore, particularly resistant to abrasion attendant upon frictional braking.

It will therefore be seen that the invention herein described provides for the manufacture of a brake drum, which is a composite integral structure, which at one time combines the beneficial factors of ease of manufacture, by using low carbon pressed metal; high resistance to the abrasion action of frictional braking, by using a high carbon steel braking flange; high resistance to corrosion, by using a calorized surface; and high heat emissivity or radiation, by utilizing an exterior surface having a high heat emissivity factor. It will also be appreciated that the functions of the carburized and calorized surfaces are closely correlated. As the carbon content of the frictional engaging surface is increased to improve its hardness, a certain increase in embrittlement also occurs. This ordinarily would be a disadvantage because the brake drum is subjected to expansions and contractions during operation, due to generated heat. However, by providing a highly emissive surface on the exterior of the drum the heat generated is very rapidly dissipated and the disadvantages due to the embrittlement of the frictional engaging surface thus largely minimized. Therefore, while specific treatments of the pressed metal drum for the purpose of modifying the respective sections of the drum to attain these desired advantages has been described, it is to be clearly understood that the invention is not limited to these treatments; but is considered to reside broadly in the concept of the provision of a new product having these described physical characteristics, because it will be appreciated that other methods or treatments of the drum to so modify the structure as to impart these characteristics may be employed. For example, instead of case carburizing the braking flange, this may be cold worked so as to increase its tensile strength as well as its hardness. Similarly, other methods may be employed to increase the corrosion resistance of the exterior surface.

I claim:

1. A brake drum comprising a pressed metal member having a frictional engaging surface of a higher degree of hardness and an external exposed surface of a higher degree of heat emissivity than the remainder of the drum.

2. A brake drum comprising a pressed steel member having a frictional engaging surface of a higher degree of hardness than the remainder of the drum, and an external surface having a higher degree of heat emissivity and resistance to corrosion than the remainder of the drum.

3. A brake drum comprising a ferruginous member having a frictional engaging surface of a higher degree of hardness than the remainder of the drum and an external surface having a higher degree of heat emissivity and resistance to corrosion than the remainder of the drum.

4. A brake drum comprising a pressed metal member having a carburized frictional engaging surface and an exterior surface of greater resistance to corrosion and greater emissivity than the remainder of the drum.

5. A brake drum of pressed metal having a frictional engaging surface which is harder than the remainder of the drum, and a calorized exterior surface.

6. A brake drum of pressed metal having a frictional engaging surface which is harder than the remainder of the drum and a non-ferrous metal oxide exterior surface.

7. A pressed steel brake drum having a braking flange the exterior surface of which is formed of a highly emissive oxide, and the interior of which is of greater hardness than the remainder of the drum.

8. The method of producing brake drums which comprises forming up a drum of low carbon steel, carburizing the frictional engaging surface thereof after such drawing, and calorizing the exposed surface.

9. The method of producing brake drums which comprises forming up a drum of low carbon steel, and subsequently subjecting the formed drum to simultaneous calorizing and carburizing processes.

RAYMOND J. NORTON.